US012615426B2

(12) United States Patent
Liao et al.

(10) Patent No.: US 12,615,426 B2
(45) Date of Patent: Apr. 28, 2026

(54) IMAGE CAPTURING MODULE FOR REDUCING OVERALL THICKNESS AND PORTABLE ELECTRONIC DEVICE FOR USING THE SAME

(71) Applicant: AZUREWAVE TECHNOLOGIES, INC., New Taipei City (TW)

(72) Inventors: Chih-Hao Liao, New Taipei City (TW); Te-Wang Tseng, New Taipei City (TW)

(73) Assignee: AZUREWAVE TECHNOLOGIES, INC., New Taipei City (TW)

( * ) Notice: Subject to any disclaimer, the term of this patent is extended or adjusted under 35 U.S.C. 154(b) by 28 days.

(21) Appl. No.: 18/763,829

(22) Filed: Jul. 3, 2024

(65) Prior Publication Data

US 2025/0324152 A1      Oct. 16, 2025

(30) Foreign Application Priority Data

Apr. 16, 2024    (CN) .......................... 202410458843.X

(51) Int. Cl.
*H04N 23/55* (2023.01)
*H04N 23/54* (2023.01)
*H04N 23/57* (2023.01)

(52) U.S. Cl.
CPC ............. *H04N 23/55* (2023.01); *H04N 23/54* (2023.01); *H04N 23/57* (2023.01)

(58) Field of Classification Search
None
See application file for complete search history.

(56) References Cited

U.S. PATENT DOCUMENTS

| | | | | |
|---|---|---|---|---|
| 8,034,652 | B2 * | 10/2011 | Nishida ................. | H10F 39/011 |
| | | | | 438/57 |
| 11,903,142 | B2 * | 2/2024 | Kim ........................ | H05K 1/117 |
| 2004/0095501 | A1 | 5/2004 | Aizawa et al. | |

(Continued)

FOREIGN PATENT DOCUMENTS

| | | |
|---|---|---|
| JP | 2007281151 A | 10/2007 |
| TW | 201901941 A | 1/2019 |

(Continued)

*Primary Examiner* — Quan Pham
(74) *Attorney, Agent, or Firm* — Li & Cai Intellectual Property (USA) Office

(57) ABSTRACT

An image capturing module and a portable electronic device for reducing overall thickness are provided. The image capturing module includes a circuit substrate, an image sensing chip, an insulating connection structure and a lens assembly. The image sensing chip is disposed in the through opening of the circuit substrate and electrically connected to the circuit substrate through a plurality of metal wires. The insulating connection structure is disposed in the through opening of the circuit substrate and connected between the image sensing chip and the circuit substrate. The lens assembly includes a lens holder disposed on the circuit substrate and a lens module carried by the lens holder. The image sensing chip can still be firmly fixed in the through opening of the circuit substrate through the insulating connection structure without contacting the circuit substrate, thereby reducing the overall thickness of the image capturing module.

19 Claims, 15 Drawing Sheets

(56) References Cited

U.S. PATENT DOCUMENTS

| | | | |
|---|---|---|---|
| 2005/0116142 A1* | 6/2005 | Mok | ...................... H04N 23/57 |
| | | | 257/E31.128 |
| 2008/0099864 A1 | 5/2008 | Wu et al. | |
| 2014/0130970 A1 | 5/2014 | Liu | |
| 2022/0026963 A1 | 1/2022 | Lee et al. | |
| 2022/0201173 A1* | 6/2022 | Lee | ........................ H04N 23/57 |

FOREIGN PATENT DOCUMENTS

| | | | |
|---|---|---|---|
| TW | 201933564 A | 8/2019 | |
| TW | 202006897 A | 2/2020 | |
| TW | 202205646 A | 2/2022 | |
| TW | M660387 U | 9/2024 | |

* cited by examiner

IMAGE CAPTURING MODULE FOR REDUCING OVERALL THICKNESS AND PORTABLE ELECTRONIC DEVICE FOR USING THE SAME

CROSS-REFERENCE TO RELATED PATENT APPLICATION

This application claims the benefit of priority to China Patent Application No. 202410458843.X, filed on Apr. 16, 2024, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an image capturing module, and more particularly to an image capturing module for reducing overall thickness and a portable electronic device configured to use the image capturing module.

BACKGROUND OF THE DISCLOSURE

In the related art, an image sensing chip of an image capturing module can be disposed on the top of a circuit substrate without openings by wire bonding, or the image sensing chip of the image capturing module can also be disposed on the bottom of the circuit substrate with an opening by flip-chip bonding. However, the prior image capturing module still has room for improvement.

SUMMARY OF THE DISCLOSURE

In response to the above-referenced technical inadequacy, the present disclosure provides an image capturing module for reducing overall thickness and a portable electronic device configured to use the image capturing module.

In order to solve the above-mentioned problems, one of the technical aspects adopted by the present disclosure is to provide an image capturing module for reducing overall thickness, which includes: a circuit substrate, an image sensing chip, an insulating connection structure and a lens assembly. The circuit substrate has an upper surface, a lower surface and a through opening connected between the upper surface and the lower surface. The image sensing chip is disposed in the through opening of the circuit substrate and electrically connected to the circuit substrate through a plurality of metal wires. The insulating connection structure is disposed in the through opening of the circuit substrate and connected between the image sensing chip and the circuit substrate. The lens assembly includes a lens holder disposed on the circuit substrate and a lens module carried by the lens holder. The image sensing chip has an image sensing area disposed on an upper surface thereof and corresponding to the lens module. A lower surface of the image sensing chip is exposed outside the circuit substrate and not covered by the insulating connection structure. The image capturing module further includes a filter element disposed and supported above the image sensing chip by a plurality of support bodies or a surrounding support member, and the filter element is surrounded by the metal wires.

In order to solve the above-mentioned problems, another one of the technical aspects adopted by the present disclosure is to provide an image capturing module for reducing overall thickness, which includes: a circuit substrate, an image sensing chip, an insulating connection structure and a lens assembly. The circuit substrate has an upper surface, a lower surface and a through opening connected between the upper surface and the lower surface. The image sensing chip is disposed in the through opening of the circuit substrate and electrically connected to the circuit substrate through a plurality of metal wires. The insulating connection structure is disposed in the through opening of the circuit substrate and connected between the image sensing chip and the circuit substrate. The lens assembly includes a lens holder disposed on the circuit substrate and a lens module carried by the lens holder. The image sensing chip has an image sensing area disposed on an upper surface thereof and corresponding to the lens module. A lower surface of the image sensing chip is exposed outside the circuit substrate and not covered by the insulating connection structure.

In order to solve the above-mentioned problems, yet another one of the technical aspects adopted by the present disclosure is to provide a portable electronic device configured to use an image capturing module, characterized in that the image capturing module includes: a circuit substrate, an image sensing chip, an insulating connection structure and a lens assembly. The circuit substrate has an upper surface, a lower surface and a through opening connected between the upper surface and the lower surface. The image sensing chip is disposed in the through opening of the circuit substrate and electrically connected to the circuit substrate through a plurality of metal wires. The insulating connection structure is disposed in the through opening of the circuit substrate and connected between the image sensing chip and the circuit substrate. The lens assembly includes a lens holder disposed on the circuit substrate and a lens module carried by the lens holder. The image sensing chip has an image sensing area disposed on an upper surface thereof and corresponding to the lens module. A lower surface of the image sensing chip is exposed outside the circuit substrate and not covered by the insulating connection structure.

Therefore, in the image capturing module and the portable electronic device provided by the present disclosure, by virtue of "the circuit substrate having an upper surface, a lower surface and a through opening connected between the upper surface and the lower surface," "the image sensing chip being disposed in the through opening of the circuit substrate and electrically connected to the circuit substrate through a plurality of metal wires" and "the insulating connection structure being disposed in the through opening of the circuit substrate and connected between the image sensing chip and the circuit substrate," the image sensing chip can still be firmly fixed in the through opening of the circuit substrate through the connection of the insulating connection structure without contacting the circuit substrate, thereby reducing the overall thickness of the image capturing module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
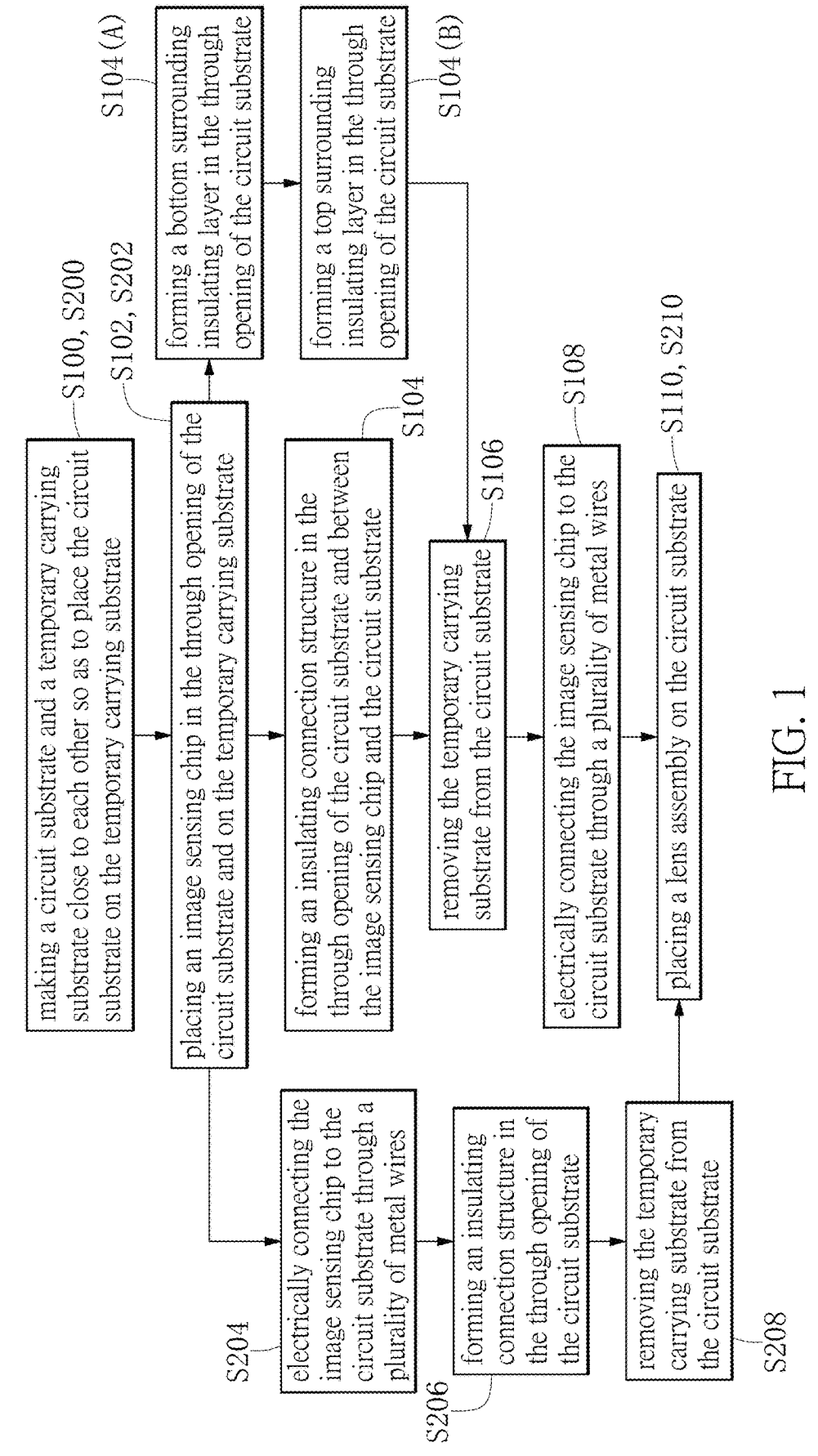
FIG. 1 is a flowchart of a method of manufacturing an image capturing module for reducing overall thickness according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
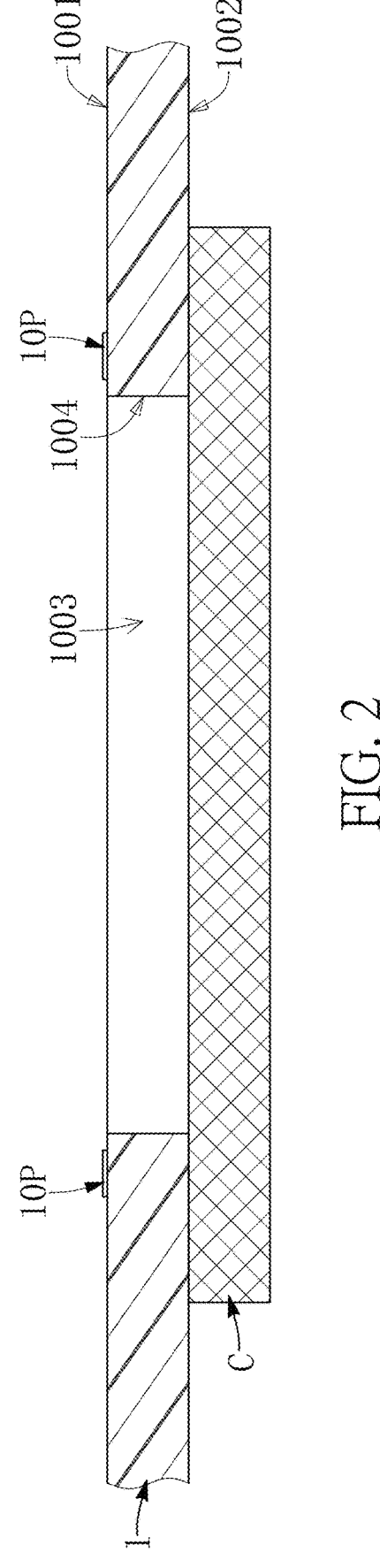
FIG. 2 is a schematic view of step S100 of the method of manufacturing the image capturing module for reducing overall thickness according to a first embodiment of the present disclosure.
Figure 3:
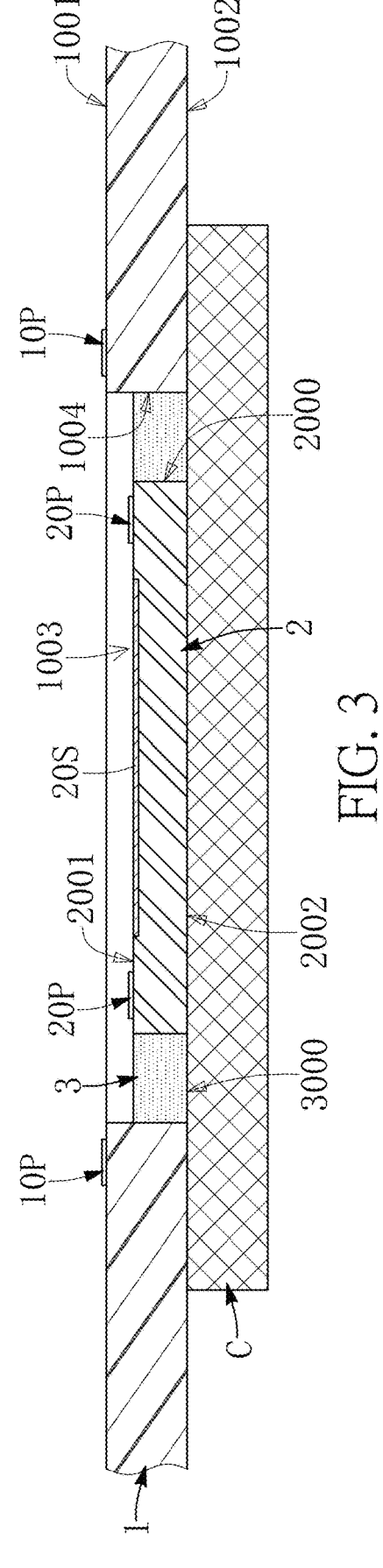
FIG. 3 is a schematic view of step S102 and step S104 of the method of manufacturing the image capturing module for reducing overall thickness according to the first embodiment of the present disclosure.
Figure 4:
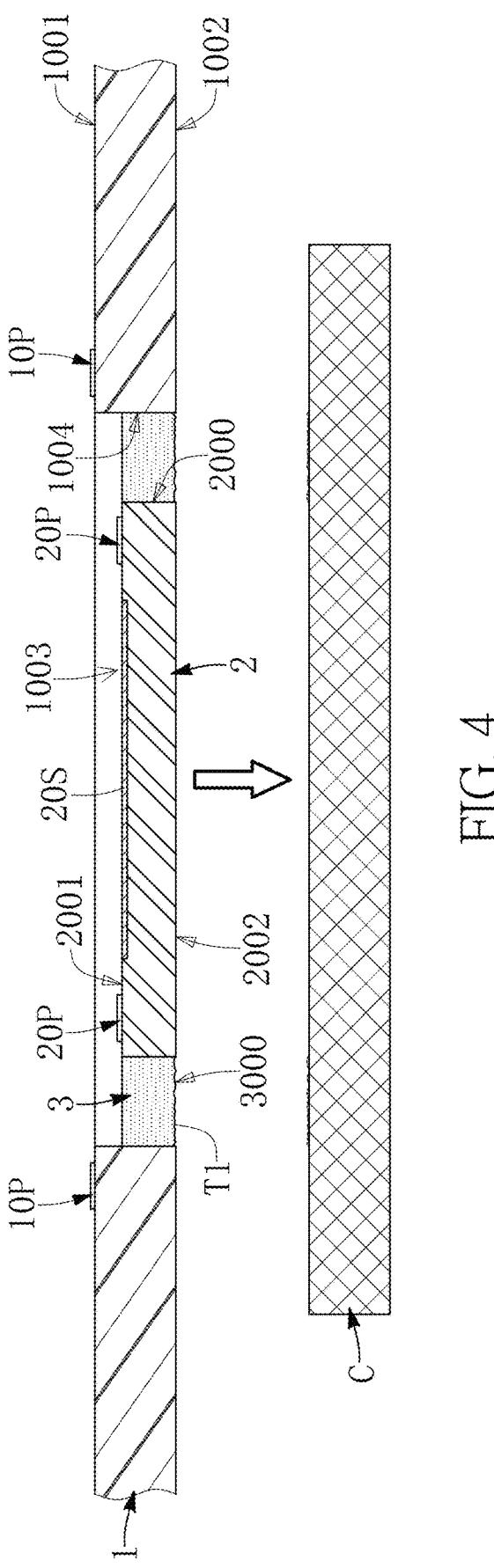
FIG. 4 is a schematic view of step S106 of the method of manufacturing the image capturing module for reducing overall thickness according to the first embodiment of the present disclosure.
Figure 5:
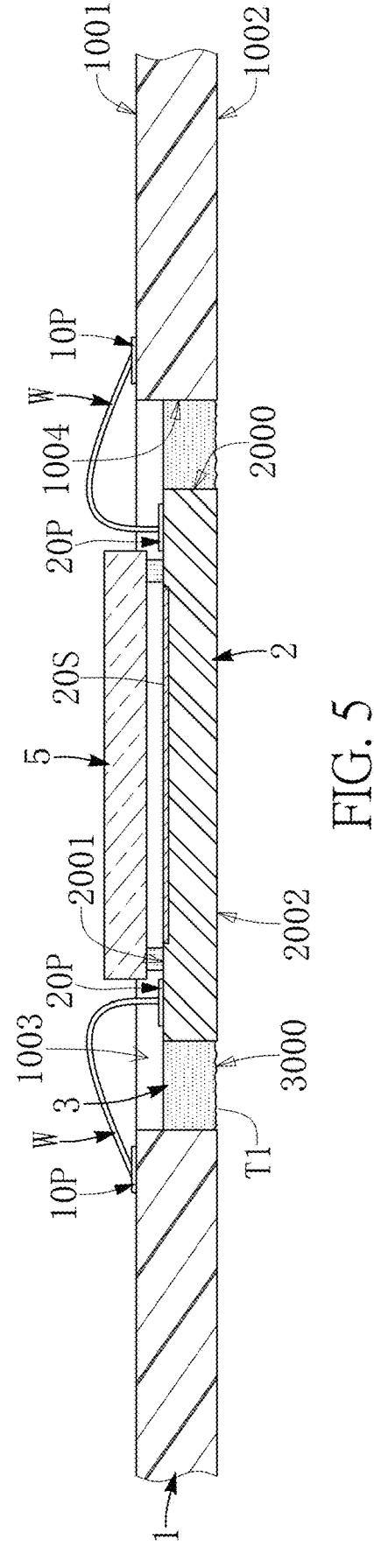
FIG. 5 is a schematic view of step S108 of the method of manufacturing the image capturing module for reducing overall thickness according to the first embodiment of the present disclosure.
Figure 6:
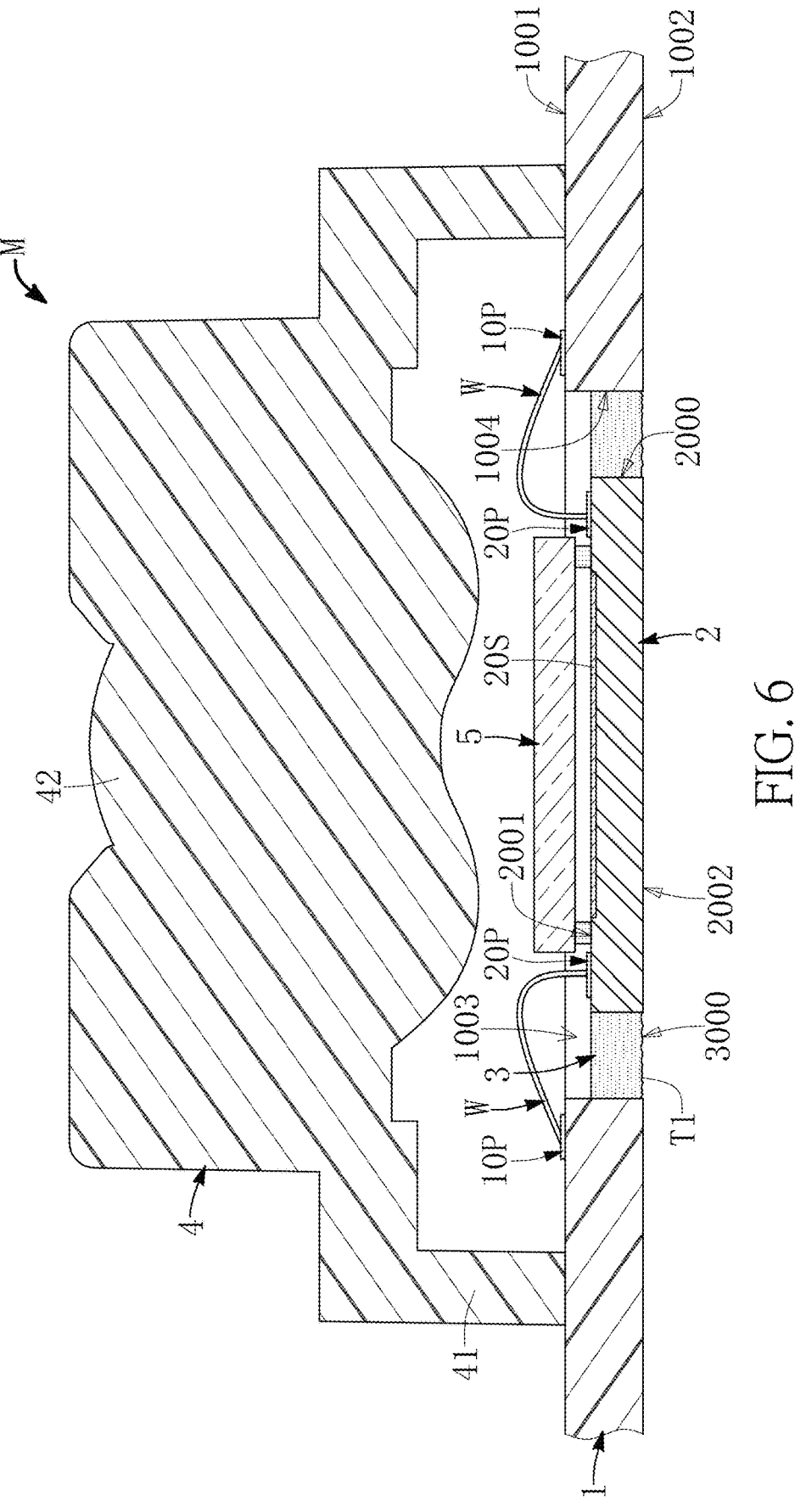
FIG. 6 is a schematic view of the image capturing module for reducing overall thickness according to the first embodiment of the present disclosure.

Referring to FIG. 1 to FIG. 6, a first embodiment of the present disclosure provides a method of manufacturing an image capturing module M (or an image sensing module) for reducing overall thickness, which includes: firstly, referring to FIG. 1 and FIG. 2, making a circuit substrate 1 and a temporary carrying substrate C (or a removable base plate, a detachable base plate or a detachable base plate) be allowed to be close to each other (or bringing a circuit substrate 1 and a temporary carrying substrate C close to each other) so as to place the circuit substrate 1 on the temporary carrying substrate C (or until the circuit substrate 1 and the temporary carrying substrate C are completely in contact with each other), in which the circuit substrate 1 has an upper surface 1001, a lower surface 1002 and a through opening 1003 connected between the upper surface 1001 and the lower surface 1002 (or a through opening 1003 passing through the circuit substrate 1), and a bottom side of the through opening 1003 of the circuit substrate 1 is closed or covered by the temporary carrying substrate C (step S100); next, referring to FIG. 1 and FIG. 3, placing an image sensing chip 2 (or an image capturing chip) in the through opening 1003 of the circuit substrate 1 and on the temporary carrying substrate C (step S102), and then forming an insulating connection structure 3 in the through opening 1003 of the circuit substrate 1 and between (or to be connected between) the image sensing chip 2 and the circuit substrate 1 (step S104); then, referring to FIG. 1 and FIG. 4, removing the temporary carrying substrate C from the circuit substrate 1 (step S106); afterward, referring to FIG. 1 and FIG. 5, electrically connecting the image sensing chip 2 to the circuit substrate 1 through a plurality of metal wires W (which can be any conductive metal material, such as gold, silver or copper) (step S108); next, referring to FIG. 1 and FIG. 6, placing a lens assembly 4 on the circuit substrate 1, in which the lens assembly 4 includes a lens holder 41 disposed on the circuit substrate 1 and a lens module 42 carried or held by the lens holder 41 (step S110). However, the aforementioned details are disclosed for exemplary purposes only, and are not meant to limit the scope of the present disclosure.

For example, referring to FIG. 1 and FIG. 2, in the step S100 of making the circuit substrate 1 and the temporary carrying substrate C close to each other so as to place the circuit substrate 1 on the temporary carrying substrate C, the circuit substrate 1 can be gradually approached to the temporary carrying substrate C, or the temporary carrying substrate C can be gradually approached to the circuit substrate 1 through the operation of the processing machine until the circuit substrate 1 and the temporary carrying substrate C are completely in contact with each other. That is to say, any method of "bringing the circuit substrate 1 and the temporary carrying substrate C close to each other so as to place the circuit substrate 1 on the temporary carrying substrate C" can be applied to the method of manufacturing the image capturing module provided by the first embodiment of the present disclosure. However, the aforementioned details are disclosed for exemplary purposes only, and are not meant to limit the scope of the present disclosure.

For example, referring to FIG. 1 and FIG. 3, in the step S102 of placing the image sensing chip 2 in the through opening 1003 of the circuit substrate 1 and on the temporary carrying substrate C, the present disclosure can first confirm the position of the through opening 1003 of the circuit substrate 1 through an image sensing module (not shown), and then accurately place the image sensing chip 2 in the through opening 1003 of the circuit substrate 1 and on the temporary carrying substrate C, thereby improving the optical alignment accuracy of the image sensing chip 2. It is worth noting that the image sensing chip 2 can be directly disposed on the temporary carrying substrate C without any extra medium, or the image sensing chip 2 can also be disposed on the temporary carrier substrate C through an adhesive layer with lower viscosity. However, the aforementioned details are disclosed for exemplary purposes only, and are not meant to limit the scope of the present disclosure.

For example, referring to FIG. 1 and FIG. 3, in the step S104 of forming the insulating connection structure 3 in the through opening 1003 of the circuit substrate 1 and between the image sensing chip 2 and the circuit substrate 1, the present disclosure can first confirm a vacant position (i.e., a space of the through opening 1003 not occupied by the image sensing chip 2) between the image sensing chip 2 and the circuit substrate 1 through an image sensing module (not shown), then fill an insulating material (such as silicone or epoxy resin) in the through opening 1003, and then using a heating device (not shown) to heat or bake the insulating material through (alternatively, the insulating material can also be harden or solidify naturally at room temperature), thereby completing the production of the insulating connection structure 3. However, the aforementioned details are disclosed for exemplary purposes only, and are not meant to limit the scope of the present disclosure.

For example, referring to FIG. 1 and FIG. 4, in the step S106 of removing the temporary carrying substrate C from the circuit substrate 1, since the circuit substrate 1 can be fixed in advance, the temporary carrying substrate C can directly move downward relative to the circuit substrate 1, so that the temporary carrying substrate C can be directly separated from the circuit substrate 1. In another feasible embodiment, the bonding force or adhesive force between the insulating connection structure 3 and the temporary carrying substrate C can be weakened or reduced through direct irradiation of laser light (or a heat source) generated by the laser generator (not shown) or indirect thermal radiation of a heat source generated by a heater (not shown), thereby allowing the temporary carrying substrate C to be detached or separated from the circuit substrate 1 in a more labor-saving manner, and thereby making the arrangement position (or the optical alignment) of the image sensing chip 2 less likely to be affected by the temporary detachment of the temporary carrying substrate C. It should be noted that when the temporary carrying substrate C moves downwardly and separates from the circuit substrate 1, the lower surrounding surface 3000 of the insulating connection structure 3 will generate a resin separation mark T1 formed after being separated from the temporary carrying substrate C (that is to say, the lower surrounding surface 3000 of the insulating connection structure 3 has a resin separation mark T1 generated after being separated from a temporary carrying substrate C). In addition, when the temporary carrying substrate C is separated from the circuit substrate 1 through direct irradiation of laser light generated by a laser generator or indirect heating by a heat source generated by a heater, the lower surrounding surface 3000 of the insulating connection structure 3 will generate a resin deformation mark (not shown) formed after being heated by a heat source generated by a laser generator or a heater (that is to say, the lower surrounding surface 3000 of the insulating connection structure 3 has a resin deformation mark T2 generated after being heated by a heat source provided by a heating module L). However, the aforementioned details are disclosed for exemplary purposes only, and are not meant to limit the scope of the present disclosure.

For example, referring to FIG. 1, FIG. 3 and FIG. 5, in the step S108 of electrically connecting the image sensing chip 2 to the circuit substrate 1 through the metal wires W, the circuit substrate 1 has a plurality of conductive substrate pads 10P disposed on the upper surface 1001 of the circuit substrate 1, the image sensing chip 2 has a plurality of conductive chip pads 20P disposed on the upper surface 2001 of the image sensing chip 2, and the conductive chip pads 20P of the image sensing chip 2 can be electrically connected to the conductive substrate pads 10P of the circuit substrate 1 through the metal wires W (such as a crossover metal lead as shown in FIG. 5, or a continuous metal track formed simultaneously on the surface of the image sensing chip 2, the surface of the insulating connection structure 3 and the surface of the circuit substrate 1), respectively. However, the aforementioned details are disclosed for exemplary purposes only, and are not meant to limit the scope of the present disclosure.

For example, as shown in FIG. 5, the method of manufacturing the image capturing module M for reducing overall thickness provided by the first embodiment of the present disclosure further includes: placing a filter element 5 above the image sensing chip 2 through a plurality of support bodies (not labeled) or a surrounding support member (not labeled). That is to say, in the step S108 of electrically connecting the image sensing chip 2 to the circuit substrate 1 through the metal wires W, the filter element 5 can be disposed and supported at a predetermined position above the image sensing chip 2 by a plurality of support bodies (not labeled) or a surrounding support member (not labeled).

However, the aforementioned details are disclosed for exemplary purposes only, and are not meant to limit the scope of the present disclosure.

Figure 7:
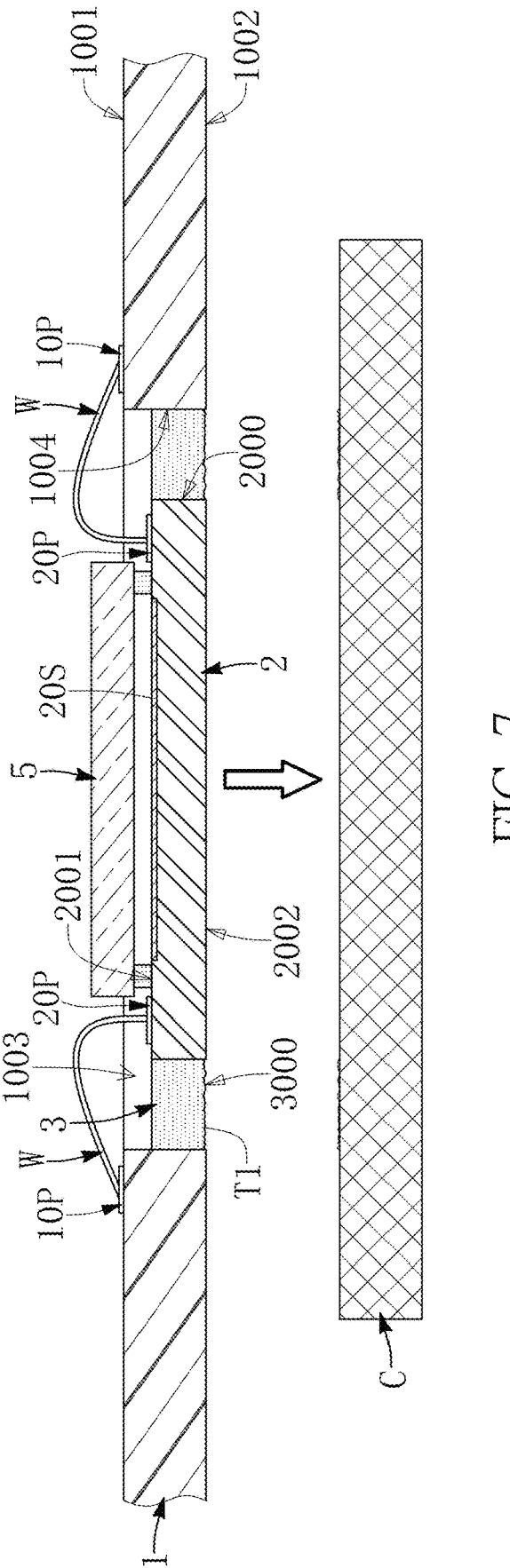
FIG. 7 is a schematic view of one feasible implementation aspect of the method of manufacturing the image capturing module for reducing overall thickness provided by the first embodiment of the present disclosure (after the step of electrically connecting the image sensing chip to the circuit substrate, the temporary carrying substrate is removed from the circuit substrate)
Figure 8:
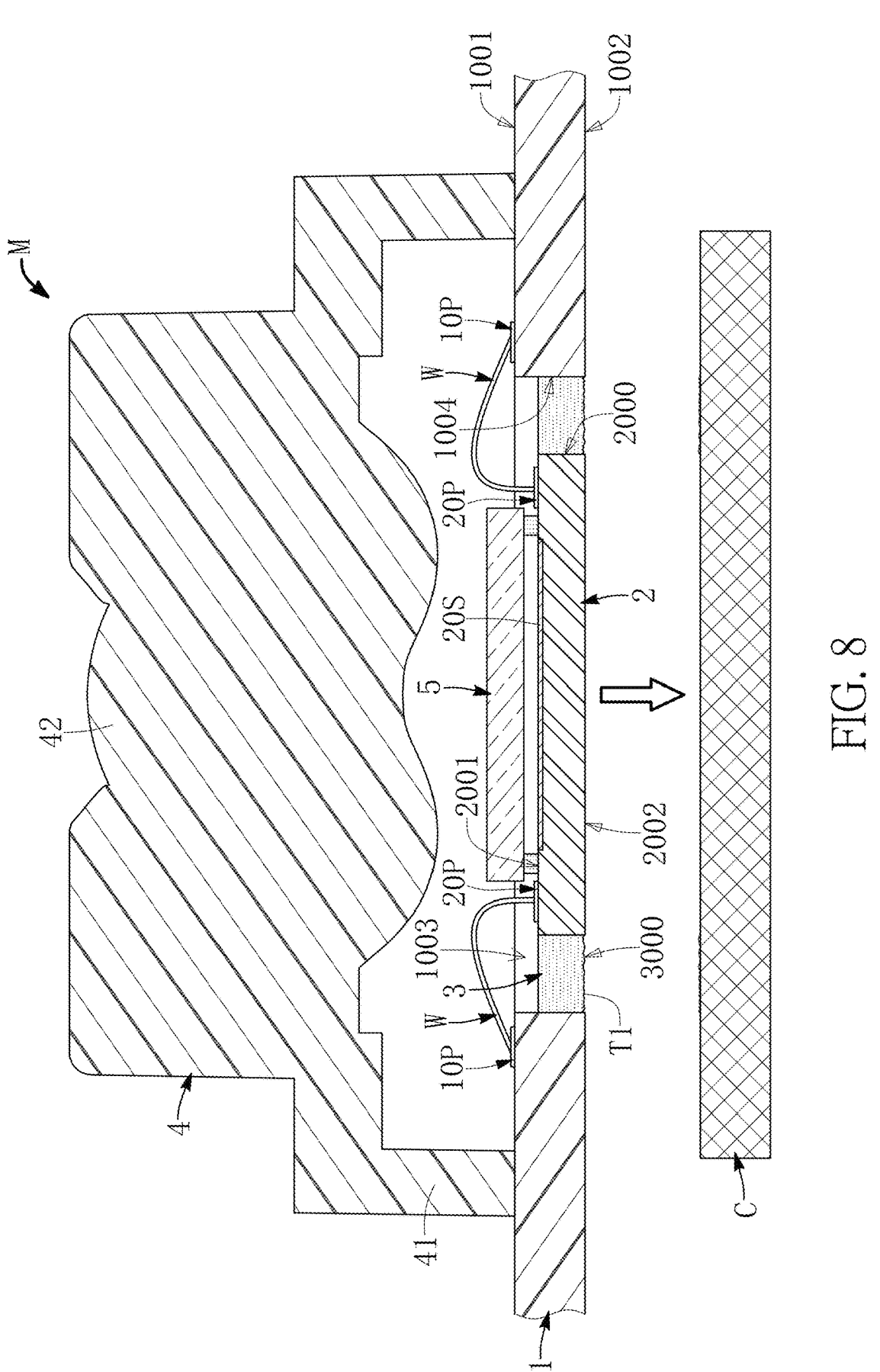
FIG. 8 is a schematic view of another feasible implementation aspect of the method of manufacturing the image capturing module for reducing overall thickness provided by the first embodiment of the present disclosure (after the step of placing the lens assembly on the circuit substrate, the temporary carrying substrate is removed from the circuit substrate)

It should be noted that, for example, as shown in FIG. 7, in one of the feasible embodiments, after the step S104 of forming the insulating connection structure 3 in the through opening 1003 of the circuit substrate 1, the temporary carrying substrate C may not be removed from the circuit substrate 1 temporarily, but as shown in FIG. 7, after the step of electrically connecting the image sensing chip 2 to the circuit substrate 1 through the metal wires W (or after the step of placing the filter element 5 above the image sensing chip 2 through a plurality of support bodies or a surrounding support member), the temporary carrying substrate C is removed from the circuit substrate 1. In addition, as shown in FIG. 8, in one of the feasible embodiments, after the step S104 of forming the insulating connection structure 3 in the through opening 1003 of the circuit substrate 1, the temporary carrying substrate C may not be removed from the circuit substrate 1 temporarily, but as shown in FIG. 8, after the step of placing the lens assembly 4 on the circuit board 1, the temporary carrying substrate C is removed from the circuit substrate 1. That is to say, according to different processing requirements, the temporary carrying substrate C can be removed from the circuit substrate 1 after the step of forming the insulating connection structure 3 in the through opening 1003 of the circuit substrate 1, the temporary carrying substrate C can be removed from the circuit substrate 1 after the step of electrically connecting the image sensing chip 2 to the circuit substrate 1 through a plurality of metal wires W, or the temporary carrying substrate C can be removed from the circuit substrate 1 after the step of placing the lens assembly 4 on the circuit substrate 1. However, the aforementioned details are disclosed for exemplary purposes only, and are not meant to limit the scope of the present disclosure.

Moreover, referring to FIG. 2 to FIG. 6, the first embodiment of the present disclosure further includes an image capturing module M (or an image sensing module) for reducing overall thickness, which includes a circuit substrate 1, an image sensing chip 2, an insulating connection structure 3 and a lens assembly 4.

Furthermore, referring to FIG. 5 and FIG. 6, the circuit substrate 1 has an upper surface 1001, a lower surface 1002 and a through opening 1003 connected between the upper surface 1001 and the lower surface 1002, and the image sensing chip 2 is disposed in the through opening 1003 of the circuit substrate 1 and electrically connected to the circuit substrate 1 through a plurality of metal wires W. For example, the circuit substrate 1 has a plurality of conductive substrate pads 10P disposed on the upper surface 1001 of the circuit substrate 1, the image sensing chip 2 has a plurality of conductive chip pads 20P disposed on the upper surface 2001 of the image sensing chip 2, and the conductive chip pads 20P of the image sensing chip 2 are electrically connected to the conductive substrate pads 10P of the circuit substrate 1 through the metal wires W, respectively. In addition, according to different usage requirements, the image sensing chip 2 can be a charge coupled device (CCD) or a complementary metal-oxide semiconductor (CMOS). However, the aforementioned details are disclosed for exemplary purposes only, and are not meant to limit the scope of the present disclosure.

More particularly, referring to FIG. 5 and FIG. 6, the insulating connection structure 3 is disposed in the through opening 1003 of the circuit substrate 1 and connected between the image sensing chip 2 and the circuit substrate 1.

In addition, the lens assembly 4 includes a lens holder 41 (or a lens carrier) disposed on the circuit substrate 1 and a lens module 42 (such as including multiple optical lenses) carried or held by the lens holder 41, and the image sensing chip 2 has an image sensing area 20S disposed on an upper surface 2001 of the image sensing chip 2 and corresponding to the lens module 42. It should be noted that a lower surface 2002 of the image sensing chip 2 is exposed outside the circuit substrate 1 and not covered by the insulating connection structure 3, the insulating connection structure 3 has a lower surrounding surface 3000 that is exposed and not covered, and the lower surrounding surface 3000 of the insulating connection structure 3, the lower surface 1002 of the circuit substrate 1 and the lower surface 2002 of the image sensing chip 2 can be completely or substantially flush (or aligned) with each other. However, the aforementioned details are disclosed for exemplary purposes only, and are not meant to limit the scope of the present disclosure.

For example, referring to FIG. 5 and FIG. 6, the thickness of the insulating connection structure 3 can be less than or equal to the thickness of the image sensing chip 2 and less than or equal to the thickness of the circuit substrate 1, and the insulating connection structure 3 can be closely or tightly connected between an outer surrounding surface 2000 of the image sensing chip 2 and an inner surrounding surface 1004 of the through opening 1003 of the circuit substrate 1. In one of the feasible embodiments, the inner surrounding surface 1004 of the through opening 1003 of the circuit substrate 1 can be configured as a surrounding roughened surface, thereby increasing a bonding force or a contact area between the insulating connection structure 3 and the circuit substrate 1. In one of the feasible embodiments, all or a part of the outer surrounding surface 2000 of the image sensing chip 2 can be covered by the insulating connection structure 3, thereby adjusting a bonding force or a contact area between the insulating connection structure 3 and the image sensing chip 2 (that is to say, when the area of the outer surrounding surface 2000 of the image sensing chip 2 covered by the insulating connection structure 3 becomes larger, the bonding force or the contact area between the insulating connection structure 3 and the image sensing chip 2 will also become larger). However, the aforementioned details are disclosed for exemplary purposes only, and are not meant to limit the scope of the present disclosure.

For example, referring to FIG. 4 and FIG. 6, the lower surrounding surface 3000 of the insulating connection structure 3 has a resin separation mark T1 (or a residual glue trace) generated after the insulating connection structure 3 is separated from a temporary carrying substrate C. In one of the feasible embodiments, when the temporary carrying substrate C is separated from the circuit substrate 1 through direct irradiation of laser light generated by a laser generator or indirect heating by a heat source generated by a heater, the lower surrounding surface 3000 of the insulating connection structure 3 will generate a resin deformation mark (or a resin deformation trace) formed after the insulating connection structure 3 is heated by a heat source generated by a laser generator or a heater. However, the aforementioned details are disclosed for exemplary purposes only, and are not meant to limit the scope of the present disclosure.

For example, referring to FIG. 5 and FIG. 6, the image capturing module M further includes a filter element 5 that can be disposed and supported above the image sensing chip 2 by a plurality of support bodies (not labeled) or a surrounding support member (not labeled), the filter element 5 can be surrounded by the metal wires W, and the height of the filter element 5 relative to the image sensing chip 2 can be higher or lower than the height of each of the metal wires W relative to the image sensing chip 2. However, the aforementioned details are disclosed for exemplary purposes only, and are not meant to limit the scope of the present disclosure.

For example, in one of the feasible embodiments, the insulating connection structure 3 has an extended connection portion (or an extension connecting portion, not shown) extending to the upper surface 1001 of the circuit substrate 1, thereby increasing the bonding force or the contact area between the insulating connection structure 3 and the circuit substrate 1. That is to say, the insulating connection structure 3 can overlap the upper surface 1001 of the circuit substrate 1 through the extension of the extended connection portion, so that the contact area between the insulating connection structure 3 and the circuit substrate 1 can be increased (or the insulating connection structure 3 can get more support from the circuit substrate 1), thereby making the insulating connection structure 3 not easily separated from the through opening 1003 of the circuit substrate 1 due to an external force (such as an external force applied for removing the temporary carrying substrate C from the circuit substrate 1, as shown in FIG. 4). However, the aforementioned details are disclosed for exemplary purposes only, and are not meant to limit the scope of the present disclosure.

Second Embodiment

Figure 9:
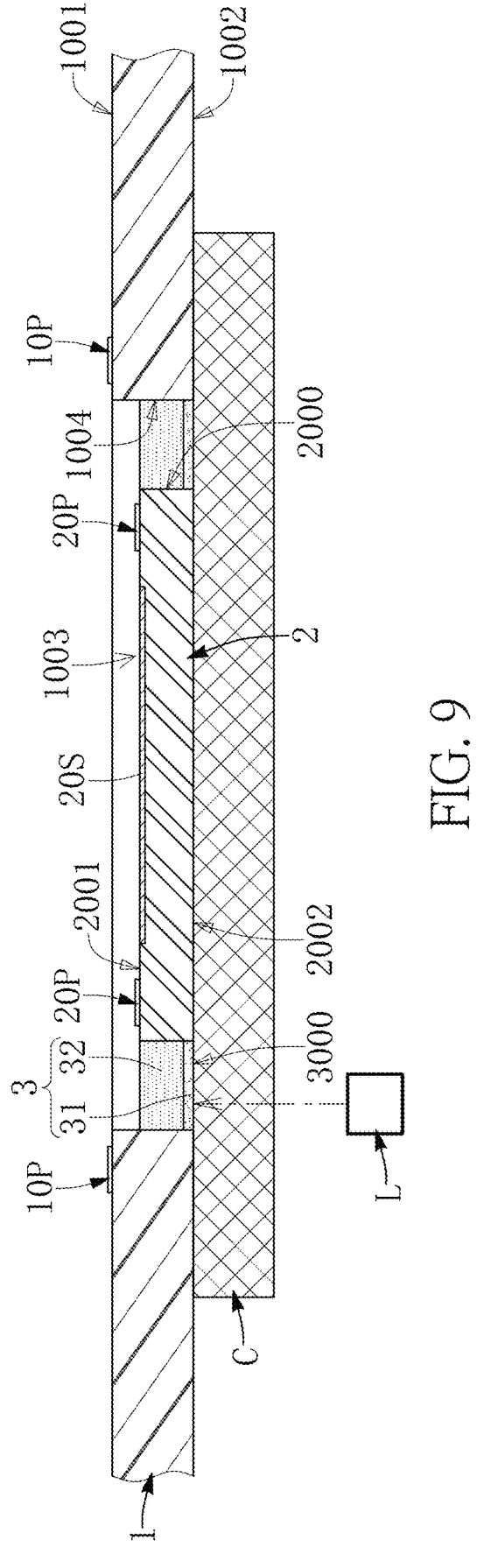
FIG. 9 is a schematic view of one feasible implementation aspect of the method of manufacturing the image capturing module for reducing overall thickness provided by a first embodiment of the present disclosure.
Figure 10:
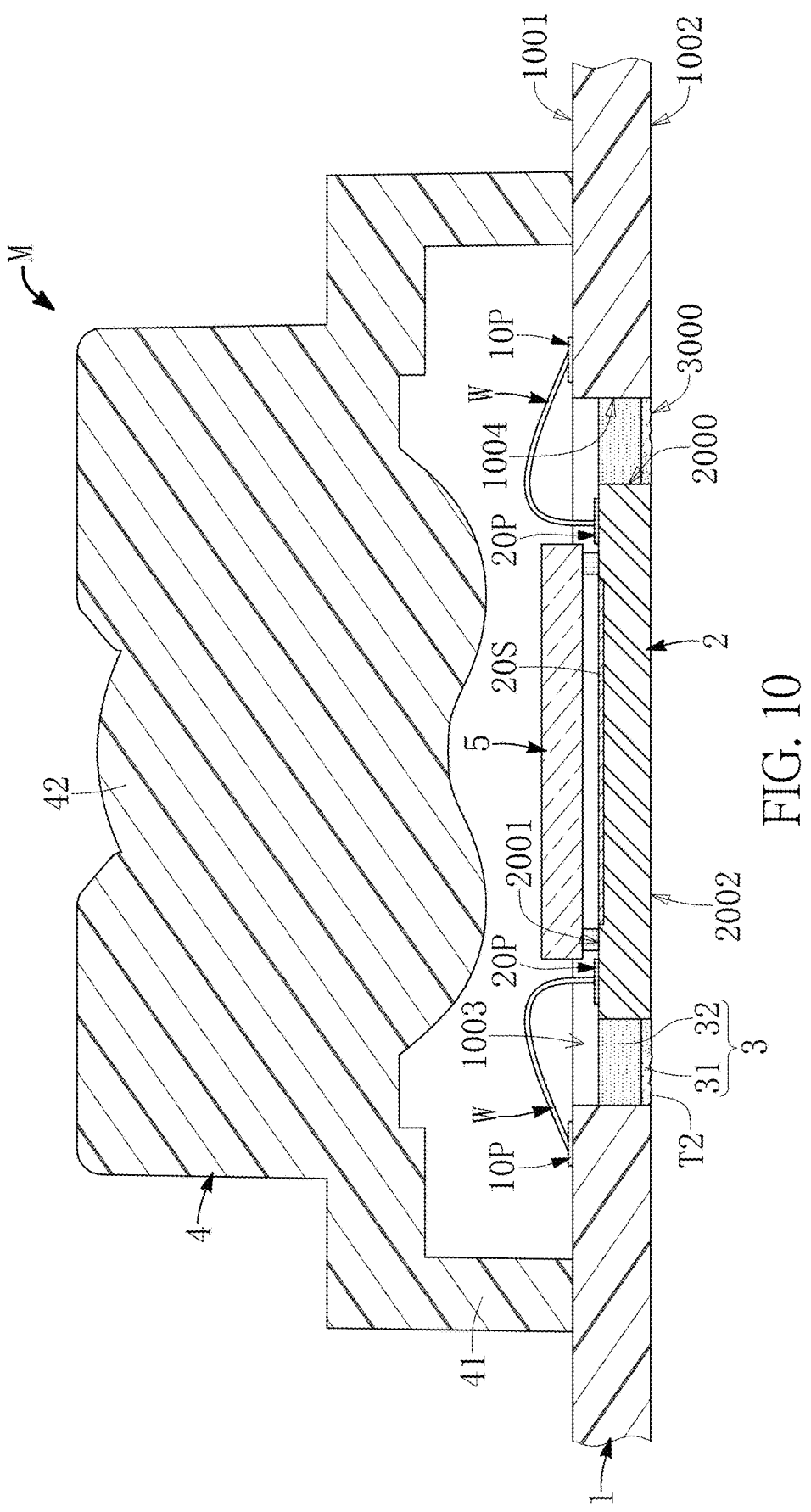
FIG. 10 is a schematic view of the image capturing module for reducing overall thickness according to the second embodiment of the present disclosure.

Referring to FIG. 1, FIG. 9 and FIG. 10, a second embodiment of the present disclosure provides a method of manufacturing an image capturing module M for reducing overall thickness and an image capturing module M for reducing overall thickness. Comparing FIG. 9 with FIG. 3, and comparing FIG. 10 with FIG. 6, the main difference between the second embodiment and the first embodiment is as follows: after the step S100 of making the circuit substrate 1 and the temporary carrying substrate C close to each other so as to place the circuit substrate 1 on the temporary carrying substrate C, the method of manufacturing the image capturing module M for reducing overall thickness provided by the second embodiment further includes: forming a bottom surrounding insulating layer 31 in the through opening 1003 of the circuit substrate 1 and between the image sensing chip 2 and the circuit substrate 1 (step S104(A)), and forming a top surrounding insulating layer 32 in the through opening 1003 of the circuit substrate 1 and between the image sensing chip 2 and the circuit substrate 1 (step S104(B)).

More particularly, referring to FIG. 9 and FIG. 10, the bottom surrounding insulating layer 31 and the top surrounding insulating layer 32 are connected to each other, and both the bottom surrounding insulating layer 31 and the top surrounding insulating layer 32 are disposed inside the through opening 1003 of the circuit substrate 1 and closely connected between the image sensing chip 2 and the circuit substrate 1. It should be noted the insulating connection structure 3 has a lower surrounding surface 3000 that is exposed and not covered, and the lower surrounding surface 3000 of the bottom surrounding insulating layer 31 of the insulating connection structure 3, the lower surface 1002 of the circuit substrate 1 and the lower surface 2002 of the image sensing chip 2 can be completely or substantially flush (or aligned) with each other. However, the aforementioned details are disclosed for exemplary purposes only, and are not meant to limit the scope of the present disclosure.

For example, referring to FIG. 9 and FIG. 10, in one of the feasible embodiments, the thickness of the bottom surrounding insulating layer 31 can be less than the thickness of the top surrounding insulating layer 32, or the viscosity of the bottom surrounding insulating layer 31 can be less than the viscosity of the top surrounding insulating layer 32, or a melting point of the bottom surrounding insulating layer 31 can be lower than a melting point of the top surrounding insulating layer 32, so that a bonding force between the bottom surrounding insulating layer 31 and the image sensing chip 2 can be smaller than a bonding force between the top surrounding insulating layer 32 and the image sensing chip 2, and a bonding force between the bottom surrounding insulating layer 31 and the circuit substrate 1 can be smaller than a bonding force between the top surrounding insulating layer 32 and the circuit substrate 1, thereby making the temporary carrying substrate C easier to detach from the circuit substrate 1. However, the aforementioned details are disclosed for exemplary purposes only, and are not meant to limit the scope of the present disclosure.

For example, referring to FIG. 9 and FIG. 10, in one of the feasible embodiments, when an inner surrounding surface 1004 of the through opening 1003 of the circuit substrate 1 can be configured as a surrounding roughened surface to contact the top surrounding insulating layer 32, the bonding force or the contact area between the top surrounding insulating layer 32 and the circuit substrate 1 can be increased through the surrounding roughened surface. However, the aforementioned details are disclosed for exemplary purposes only, and are not meant to limit the scope of the present disclosure.

For example, referring to FIG. 9 and FIG. 10, in one of the feasible embodiments, when the temporary carrying substrate C is separated from the circuit substrate 1 through direct irradiation of laser light generated by a laser generator (or through the laser light generated by the laser generator that can directly irradiate the bottom surrounding insulating layer 31) or indirect heating by a heat source generated by a heater (or through the heat source generated by the heater that can indirectly heat the bottom surrounding insulating layer 31), the lower surrounding surface 3000 of the bottom surrounding insulating layer 31 of the insulating connection structure 3 will generate a resin deformation mark T2 formed after being heated by a heat source generated by a heating module L (such as a laser generator or a heater). In one of the feasible embodiments, when the temporary carrying substrate C moves downwardly and separates from the circuit substrate 1, the lower surrounding surface 3000 of the bottom surrounding insulating layer 31 of the insulating connection structure 3 will generate a resin separation mark (not shown) formed after being separated from the temporary carrying substrate C. However, the aforementioned details are disclosed for exemplary purposes only, and are not meant to limit the scope of the present disclosure.

For example, in one of the feasible embodiments, the top surrounding insulating layer 32 of the insulating connection structure 3 has an extended connection portion (or an extension connecting portion, not shown) extending to the upper surface 1001 of the circuit substrate 1, thereby increasing the bonding force or the contact area between the top surrounding insulating layer 32 of the insulating connection structure 3 and the circuit substrate 1. That is to say, the top surrounding insulating layer 32 of the insulating connection structure 3 can overlap the upper surface 1001 of the circuit substrate 1 through the extension of the extended connection portion, so that the contact area between the top surrounding insulating layer 32 of the insulating connection structure 3 and the circuit substrate 1 can be increased (or the top surrounding insulating layer 32 of the insulating connection structure 3 can get more support from the circuit substrate 1), thereby making the insulating connection structure 3 not easily separated from the through opening 1003 of the circuit substrate 1 due to an external force (such as an external force applied for removing the temporary carrying substrate C from the circuit substrate 1, as shown in FIG. 4). However, the aforementioned details are disclosed for exemplary purposes only, and are not meant to limit the scope of the present disclosure.

Third Embodiment

Figure 11:
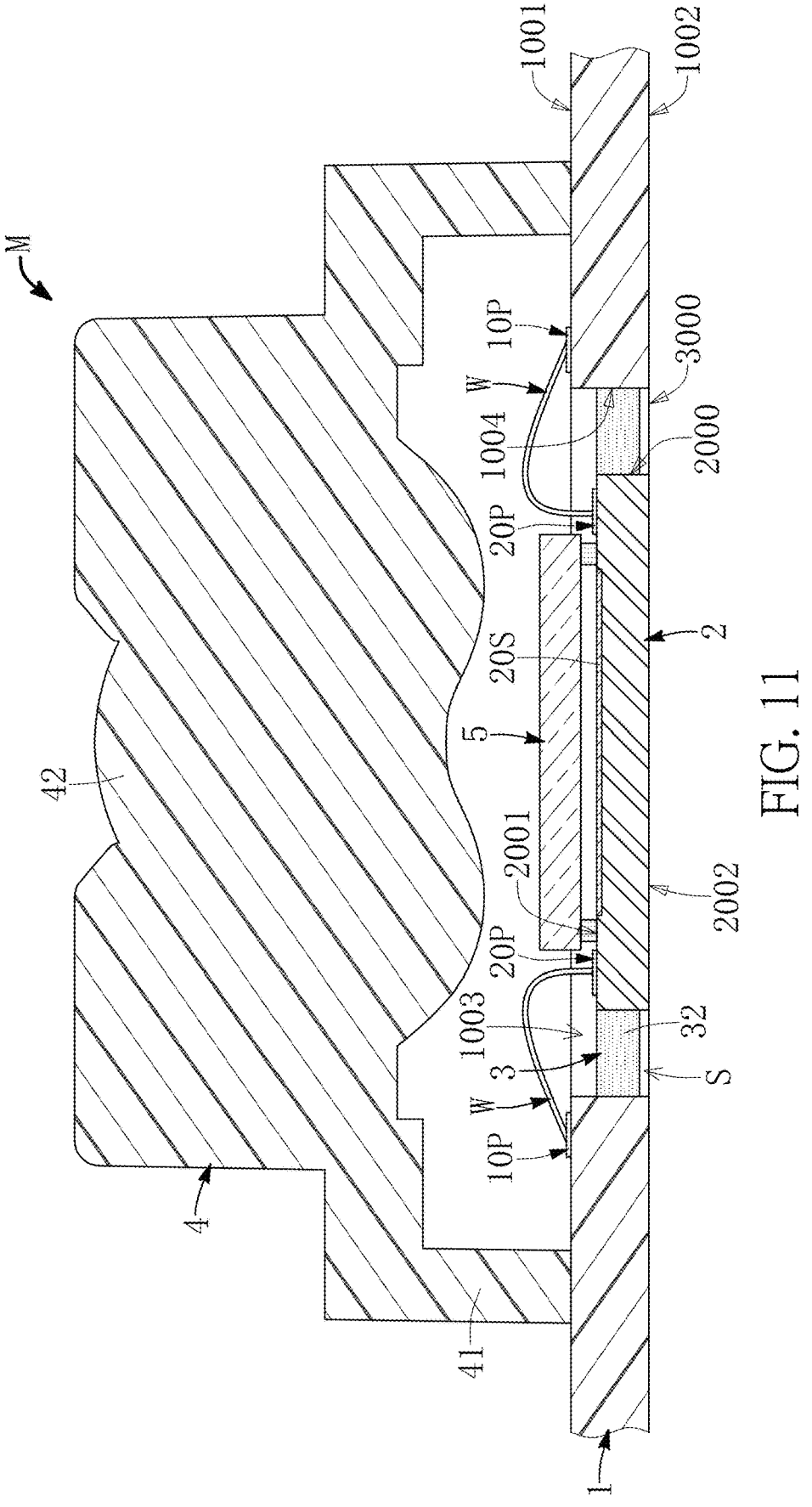
FIG. 11 is a schematic view of the image capturing module for reducing overall thickness according to a third embodiment of the present disclosure.

Referring to FIG. 11, a third embodiment of the present disclosure provides a method of manufacturing an image capturing module M for reducing overall thickness. Comparing FIG. 11 with FIG. 10, the main difference between the third embodiment and the second embodiment is as follows: in the third embodiment, the top surrounding insulating layer 32 of the insulating connection structure 3 has a lower surrounding surface 3000 that is exposed and not covered, and a predetermined vertical height is defined between the lower surrounding surface 3000 of the top surrounding insulating layer 32 of the insulating connection structure 3 and the lower surface 1002 of the circuit substrate 1, so that a surrounding unoccupied space S can be formed or defined between the circuit substrate 1, the image sensing chip 2 and the insulating connection structure 3.

For example, the surrounding unoccupied space S can be formed by removing a part of the bottom material of the insulating connection structure 3 (such as by a laser generator or a heater), so that the lower surrounding surface 3000 of the top surrounding insulating layer 32 of the insulating connection structure 3, a portion of the inner surrounding surface 1004 of the through opening 1003 of the circuit substrate 1 and a portion of the outer surrounding surface 2000 of the image sensing chip 2 can be exposed from the bottom side of the through opening 1003 of the circuit substrate 1. However, the aforementioned details are disclosed for exemplary purposes only, and are not meant to limit the scope of the present disclosure.

Fourth Embodiment

Figure 12:
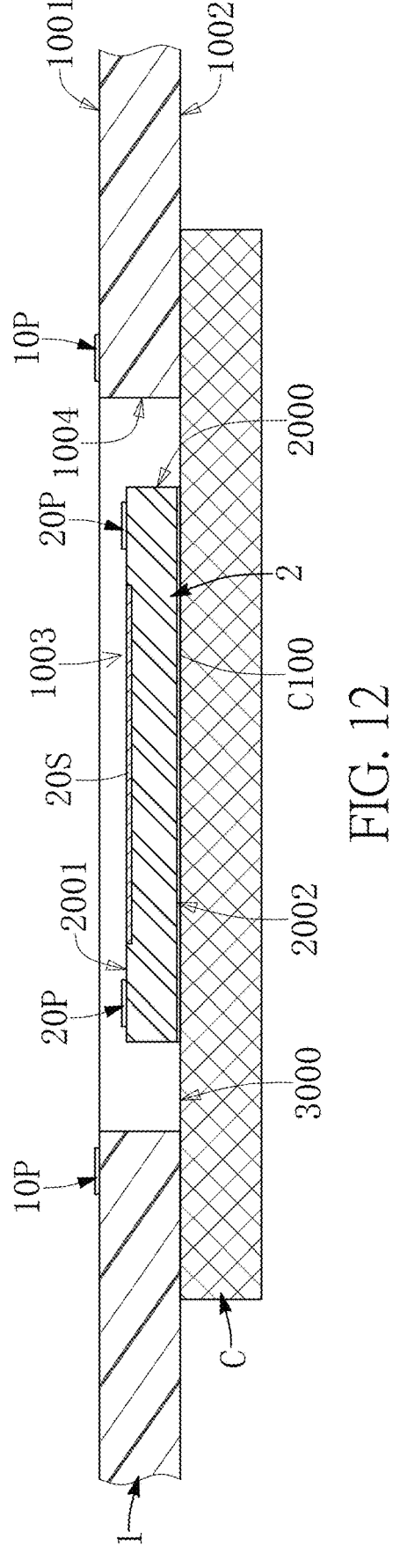
FIG. 12 is a schematic view of step S200 and step S202 of the method of manufacturing the image capturing module for reducing overall thickness according to a fourth embodiment of the present disclosure.
Figure 13:
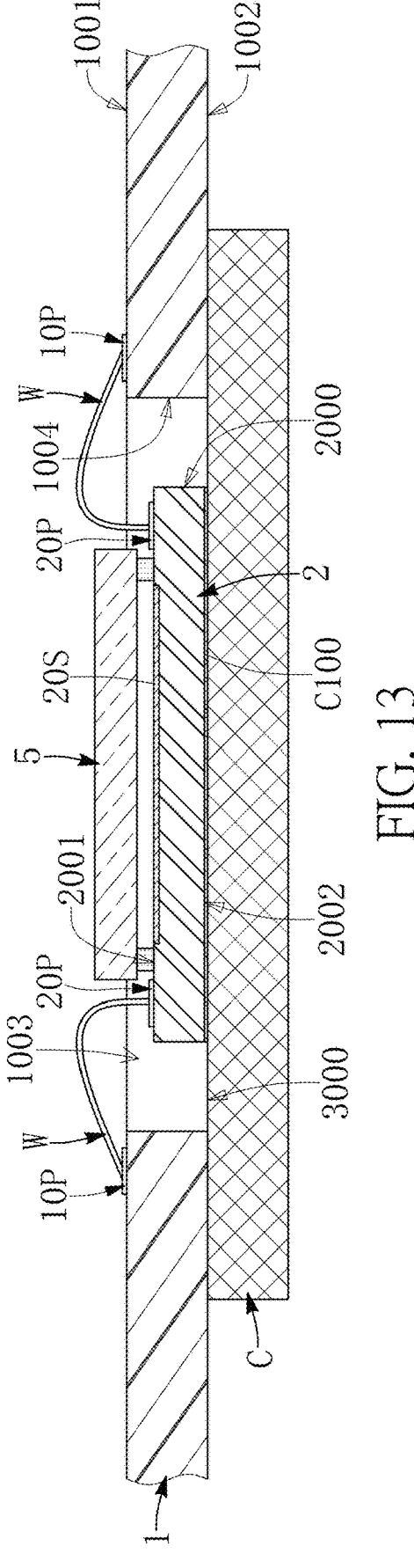
FIG. 13 is a schematic view of step S204 of the method of manufacturing the image capturing module for reducing overall thickness according to the fourth embodiment of the present disclosure.
Figure 14:
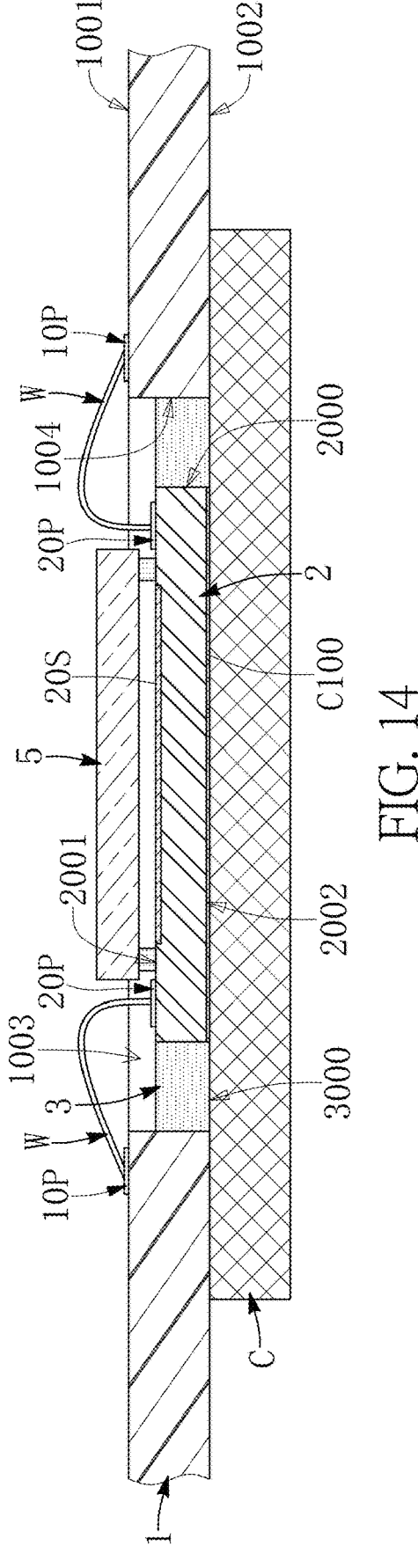
FIG. 14 is a schematic view of step S206 of the method of manufacturing the image capturing module for reducing overall thickness according to the fourth embodiment of the present disclosure.

Referring to FIG. 1 and FIG. 12 to FIG. 14, a fourth embodiment of the present disclosure provides a method of manufacturing an image capturing module M for reducing overall thickness, which includes: firstly, referring to FIG. 1 and FIG. 12, making a circuit substrate 1 and a temporary carrying substrate C (or a removable base plate, a detachable base plate or a detachable base plate) be allowed to be close to each other (or bringing a circuit substrate 1 and a temporary carrying substrate C close to each other) so as to place the circuit substrate 1 on the temporary carrying substrate C (or until the circuit substrate 1 and the temporary carrying substrate C are completely in contact with each other), in which the circuit substrate 1 has an upper surface 1001, a lower surface 1002 and a through opening 1003 connected between the upper surface 1001 and the lower surface 1002 (or a through opening 1003 passing through the circuit substrate 1), and a bottom side of the through opening 1003 of the circuit substrate 1 is closed or covered by the temporary carrying substrate C (step S200); next, referring to FIG. 1 and FIG. 12, placing an image sensing chip 2 (or an image capturing chip) in the through opening 1003 of the circuit substrate 1 and on the temporary carrying substrate C through an adhesive layer C100 (such as double-sided tape or any kind of adhesive layer) (step S202); then, referring to FIG. 1 and FIG. 13, electrically connecting the image sensing chip 2 to the circuit substrate 1 through a plurality of metal wires W (which can be any conductive metal material, such as gold, silver or copper) (or placing a filter element 5 above the image sensing chip 2 through a plurality of support bodies or a surrounding support member) (step S204); afterward, referring to FIG. 1 and FIG. 14, forming an insulating connection structure 3 in the through opening 1003 of the circuit substrate 1 and between (or to be connected between) the image sensing chip 2 and the circuit substrate 1 (step S206); next, as shown in FIG. 1, removing the temporary carrying substrate C from the circuit substrate 1 (step S208); then, as shown in FIG. 1, placing a lens assembly 4 on the circuit substrate 1, in which the lens assembly 4 includes a lens holder 41 disposed on the circuit substrate 1 and a lens module 42 carried or held by the lens holder 41 (step S210). It should be noted that the step S208 and the step S210 can also be performed reversely. For example, in one of the feasible embodiments, the adhesive layer C100 can also be distributed over a larger area on the entire temporary carrying substrate C, so that the adhesive layer C100 can also be disposed between the circuit substrate 1 and the temporary carrying substrate C, and the adhesive layer C100 can also be disposed between the insulating connection structure 3 and the temporary carrying substrate C. However, the aforementioned details are disclosed for exemplary purposes only, and are not meant to limit the scope of the present disclosure.

That is to say, referring to FIG. 3, FIG. 5, FIG. 12, FIG. 13 and FIG. 14, the wire bonding step (or a chip electrical connection step) of electrically connecting the image sensing chip 2 to the circuit substrate 1 through the metal wires W and the glue filling step (or a chip position-limiting step) of forming the insulating connection structure 3 in the through opening 1003 of the circuit substrate 1 and between the image sensing chip 2 and the circuit substrate 1 can be performed or executed in sequence (sequentially) or in reverse (reversely), so that the glue filling step can be performed first and then the wire bonding step can be performed next (as shown in FIG. 3 and FIG. 5), or the wire bonding step can be performed first and then the glue filling step can be performed next (as shown in FIG. 12, FIG. 13 and FIG. 14).

Fifth Embodiment

Figure 15:
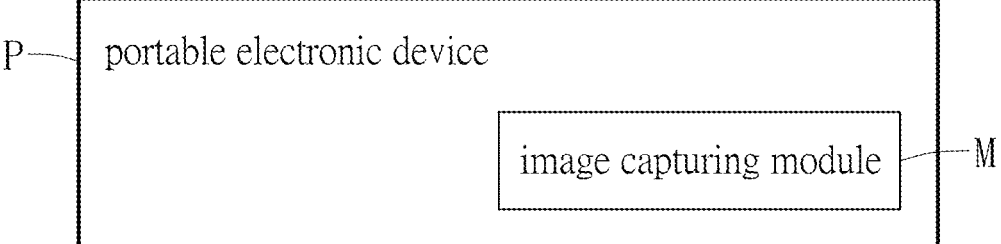
FIG. 15 is a functional block diagram of a portable electronic device using the image capturing module according to a fifth embodiment of the present disclosure.

Referring to FIG. 15, a fifth embodiment of the present disclosure provides a portable electronic device P. The portable electronic device P can be configured to use any image capturing module M provided in the first to third embodiments. For example, the portable electronic device P can be a smartphone, a desktop computer, a notebook computer, a tablet computer or any kind of electronic device. However, the aforementioned details are disclosed for exemplary purposes only, and are not meant to limit the scope of the present disclosure.

Beneficial Effects of the Embodiments

In conclusion, in the image capturing module M and the portable electronic device provided by the present disclosure, by virtue of "the circuit substrate 1 having an upper surface 1001, a lower surface 1002 and a through opening 1003 connected between the upper surface 1001 and the lower surface 1002," "the image sensing chip 2 being disposed in the through opening 1003 of the circuit substrate 1 and electrically connected to the circuit substrate 1 through a plurality of metal wires W" and "the insulating connection structure 3 being disposed in the through opening 1003 of the circuit substrate 1 and connected between the image sensing chip 2 and the circuit substrate 1," the image sensing chip 2 can still be firmly fixed in the through opening 1003 of the circuit substrate 1 through the connection of the insulating connection structure 3 without contacting the circuit substrate 1, thereby reducing the overall thickness of the image capturing module M.

Furthermore, the method of manufacturing the image capturing module M provided by the present disclosure, by virtue of "making a circuit substrate 1 and a temporary carrying substrate C be allowed to be close to each other so as to place the circuit substrate 1 on the temporary carrying substrate C" and "performing a first step and a second step in sequence or reversely, in which the first step includes forming an insulating connection structure 3 in the through opening 1003 of the circuit substrate 1 and between the image sensing chip 2 and the circuit substrate 1, and the second step includes electrically connecting the image sensing chip 2 to the circuit substrate 1 through a plurality of metal wires W," the image sensing chip 2 can still be firmly fixed in the through opening 1003 of the circuit substrate 1 through the connection of the insulating connection structure 3 without contacting the circuit substrate 1, thereby reducing the overall thickness of the image capturing module M.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An image capturing module for reducing overall thickness, comprising:
a circuit substrate having an upper surface, a lower surface and a through opening connected between the upper surface and the lower surface;
an image sensing chip disposed in the through opening of the circuit substrate and electrically connected to the circuit substrate through a plurality of metal wires;
an insulating connection structure disposed in the through opening of the circuit substrate and connected between the image sensing chip and the circuit substrate; and
a lens assembly including a lens holder disposed on the circuit substrate and a lens module carried by the lens holder;
wherein the image sensing chip has an image sensing area disposed on an upper surface thereof and corresponding to the lens module;
wherein a lower surface of the image sensing chip is exposed outside the circuit substrate and not covered by the insulating connection structure;
wherein the image capturing module further includes a filter element disposed and supported above the image sensing chip by a plurality of support bodies or a surrounding support member, and the filter element is surrounded by the metal wires;
wherein the insulating connection structure includes a bottom surrounding insulating layer and a top surrounding insulating layer connected to the bottom surrounding insulating layer.

2. The image capturing module according to claim 1, wherein the circuit substrate has a plurality of conductive substrate pads disposed on the upper surface thereof, the image sensing chip has a plurality of conductive chip pads disposed on the upper surface thereof, and the conductive chip pads of the image sensing chip are electrically connected to the conductive substrate pads of the circuit substrate through the metal wires, respectively;
wherein the insulating connection structure is closely connected between an outer surrounding surface of the image sensing chip and an inner surrounding surface of the through opening of the circuit substrate;
wherein the inner surrounding surface of the through opening of the circuit substrate is configured as a surrounding roughened surface, thereby increasing a bonding force or a contact area between the insulating connection structure and the circuit substrate;
wherein, all or a part of the outer surrounding surface of the image sensing chip is covered by the insulating connection structure, thereby adjusting a bonding force or a contact area between the insulating connection structure and the image sensing chip;
wherein a thickness of the insulating connection structure is less than or equal to a thickness of the image sensing chip and less than or equal to a thickness of the circuit substrate;
wherein the insulating connection structure has a lower surrounding surface that is exposed and not covered, and the lower surrounding surface of the insulating connection structure, the lower surface of the circuit substrate and the lower surface of the image sensing chip are flush with each other;
wherein the lower surrounding surface of the insulating connection structure has a resin separation mark generated after being separated from a temporary carrying substrate;
wherein the lower surrounding surface of the insulating connection structure has a resin deformation mark generated after being heated by a heat source provided by a heating module;
wherein the insulating connection structure has an extended connection portion extending to the upper surface of the circuit substrate, thereby increasing the bonding force or the contact area between the insulating connection structure and the circuit substrate.

3. The image capturing module according to claim 1, wherein the bottom surrounding insulating layer and the top surrounding insulating layer are disposed inside the through opening of the circuit substrate and connected between the image sensing chip and the circuit substrate;
wherein a thickness of the bottom surrounding insulating layer is less than a thickness of the top surrounding insulating layer, viscosity of the bottom surrounding insulating layer is less than viscosity of the top surrounding insulating layer, and a melting point of the bottom surrounding insulating layer is lower than a melting point of the top surrounding insulating layer;
wherein a bonding force between the bottom surrounding insulating layer and the image sensing chip is smaller than a bonding force between the top surrounding insulating layer and the image sensing chip, and a bonding force between the bottom surrounding insulating layer and the circuit substrate is smaller than a bonding force between the top surrounding insulating layer and the circuit substrate;

wherein an inner surrounding surface of the through opening of the circuit substrate is configured as a surrounding roughened surface to contact the top surrounding insulating layer, thereby increasing the bonding force or the contact area between the top surrounding insulating layer and the circuit substrate;

wherein the insulating connection structure has a lower surrounding surface that is exposed and not covered, and the lower surrounding surface of the insulating connection structure, the lower surface of the circuit substrate and the lower surface of the image sensing chip are flush with each other;

wherein the lower surrounding surface of the bottom surrounding insulating layer has a resin separation mark generated after being separated from a temporary carrying substrate;

wherein the lower surrounding surface of the bottom surrounding insulating layer has a resin deformation mark generated after being heated by a heat source provided by a heating module;

wherein the top surrounding insulating layer of the insulating connection structure has an extended connection portion extending to the upper surface of the circuit substrate, thereby increasing a bonding force or a contact area between the insulating connection structure and the circuit substrate.

4. The image capturing module according to claim 1, wherein the insulating connection structure has a lower surrounding surface that is exposed and not covered, and a predetermined vertical height is defined between the lower surrounding surface of the insulating connection structure and the lower surface of the circuit substrate, so that a surrounding unoccupied space is formed between the circuit substrate, the image sensing chip and the insulating connection structure;

wherein the insulating connection structure is closely connected between an outer surrounding surface of the image sensing chip and an inner surrounding surface of the through opening of the circuit substrate, and the lower surrounding surface of the insulating connection structure, a portion of the inner surrounding surface of the through opening of the circuit substrate, and a portion of the outer surrounding surface of the image sensing chip are exposed from a bottom side of the through opening of the circuit substrate;

wherein the insulating connection structure has an extended connection portion extending to the upper surface of the circuit substrate, thereby increasing a bonding force or a contact area between the insulating connection structure and the circuit substrate.

5. An image capturing module for reducing overall thickness, comprising:

a circuit substrate having an upper surface, a lower surface and a through opening connected between the upper surface and the lower surface;

an image sensing chip disposed in the through opening of the circuit substrate and electrically connected to the circuit substrate through a plurality of metal wires;

an insulating connection structure disposed in the through opening of the circuit substrate and connected between the image sensing chip and the circuit substrate; and a lens assembly including a lens holder disposed on the circuit substrate and a lens module carried by the lens holder;

wherein the image sensing chip has an image sensing area disposed on an upper surface thereof and corresponding to the lens module;

wherein a lower surface of the image sensing chip is exposed outside the circuit substrate and not covered by the insulating connection structure;

wherein the insulating connection structure includes a bottom surrounding insulating layer and a top surrounding insulating layer connected to the bottom surrounding insulating layer.

6. The image capturing module according to claim 5, wherein the circuit substrate has a plurality of conductive substrate pads disposed on the upper surface thereof, the image sensing chip has a plurality of conductive chip pads disposed on the upper surface thereof, and the conductive chip pads of the image sensing chip are electrically connected to the conductive substrate pads of the circuit substrate through the metal wires, respectively;

wherein the insulating connection structure is closely connected between an outer surrounding surface of the image sensing chip and an inner surrounding surface of the through opening of the circuit substrate;

wherein the inner surrounding surface of the through opening of the circuit substrate is configured as a surrounding roughened surface, thereby increasing a bonding force or a contact area between the insulating connection structure and the circuit substrate;

wherein, all or a part of the outer surrounding surface of the image sensing chip is covered by the insulating connection structure, thereby adjusting a bonding force or a contact area between the insulating connection structure and the image sensing chip;

wherein a thickness of the insulating connection structure is less than or equal to a thickness of the image sensing chip and less than or equal to a thickness of the circuit substrate;

wherein the insulating connection structure has a lower surrounding surface that is exposed and not covered, and the lower surrounding surface of the insulating connection structure, the lower surface of the circuit substrate and the lower surface of the image sensing chip are flush with each other;

wherein the lower surrounding surface of the insulating connection structure has a resin separation mark generated after being separated from a temporary carrying substrate;

wherein the lower surrounding surface of the insulating connection structure has a resin deformation mark generated after being heated by a heat source provided by a heating module;

wherein the insulating connection structure has an extended connection portion extending to the upper surface of the circuit substrate, thereby increasing the bonding force or the contact area between the insulating connection structure and the circuit substrate.

7. The image capturing module according to claim 5, wherein the bottom surrounding insulating layer and the top surrounding insulating layer are disposed inside the through opening of the circuit substrate and connected between the image sensing chip and the circuit substrate;

wherein a thickness of the bottom surrounding insulating layer is less than a thickness of the top surrounding insulating layer, viscosity of the bottom surrounding insulating layer is less than viscosity of the top surrounding insulating layer, and a melting point of the bottom surrounding insulating layer is lower than a melting point of the top surrounding insulating layer;

wherein a bonding force between the bottom surrounding insulating layer and the image sensing chip is smaller than a bonding force between the top surrounding insulating layer and the image sensing chip, and a bonding force between the bottom surrounding insulating layer and the circuit substrate is smaller than a bonding force between the top surrounding insulating layer and the circuit substrate;

wherein an inner surrounding surface of the through opening of the circuit substrate is configured as a surrounding roughened surface to contact the top surrounding insulating layer, thereby increasing the bonding force or the contact area between the top surrounding insulating layer and the circuit substrate;

wherein the insulating connection structure has a lower surrounding surface that is exposed and not covered, and the lower surrounding surface of the insulating connection structure, the lower surface of the circuit substrate and the lower surface of the image sensing chip are flush with each other;

wherein the lower surrounding surface of the bottom surrounding insulating layer has a resin separation mark generated after being separated from a temporary carrying substrate;

wherein the lower surrounding surface of the bottom surrounding insulating layer has a resin deformation mark generated after being heated by a heat source provided by a heating module;

wherein the top surrounding insulating layer of the insulating connection structure has an extended connection portion extending to the upper surface of the circuit substrate, thereby increasing a bonding force or a contact area between the insulating connection structure and the circuit substrate.

8. The image capturing module according to claim 5, wherein the insulating connection structure has a lower surrounding surface that is exposed and not covered, and a predetermined vertical height is defined between the lower surrounding surface of the insulating connection structure and the lower surface of the circuit substrate, so that a surrounding unoccupied space is formed between the circuit substrate, the image sensing chip and the insulating connection structure;

wherein the insulating connection structure is closely connected between an outer surrounding surface of the image sensing chip and an inner surrounding surface of the through opening of the circuit substrate, and the lower surrounding surface of the insulating connection structure, a portion of the inner surrounding surface of the through opening of the circuit substrate, and a portion of the outer surrounding surface of the image sensing chip are exposed from a bottom side of the through opening of the circuit substrate;

wherein the insulating connection structure has an extended connection portion extending to the upper surface of the circuit substrate, thereby increasing a bonding force or a contact area between the insulating connection structure and the circuit substrate.

9. A portable electronic device configured to use an image capturing module, characterized in that the image capturing module includes:

a circuit substrate having an upper surface, a lower surface and a through opening connected between the upper surface and the lower surface;

an image sensing chip disposed in the through opening of the circuit substrate and electrically connected to the circuit substrate through a plurality of metal wires;

an insulating connection structure disposed in the through opening of the circuit substrate and connected between the image sensing chip and the circuit substrate; and a lens assembly including a lens holder disposed on the circuit substrate and a lens module carried by the lens holder;

wherein the image sensing chip has an image sensing area disposed on an upper surface thereof and corresponding to the lens module;

wherein a lower surface of the image sensing chip is exposed outside the circuit substrate and not covered by the insulating connection structure;

wherein the insulating connection structure includes a bottom surrounding insulating layer and a top surrounding insulating layer connected to the bottom surrounding insulating layer.

10. The portable electronic device according to claim 9, wherein the circuit substrate has a plurality of conductive substrate pads disposed on the upper surface thereof, the image sensing chip has a plurality of conductive chip pads disposed on the upper surface thereof, and the conductive chip pads of the image sensing chip are electrically connected to the conductive substrate pads of the circuit substrate through the metal wires, respectively;

wherein the insulating connection structure is closely connected between an outer surrounding surface of the image sensing chip and an inner surrounding surface of the through opening of the circuit substrate;

wherein the inner surrounding surface of the through opening of the circuit substrate is configured as a surrounding roughened surface, thereby increasing a bonding force or a contact area between the insulating connection structure and the circuit substrate;

wherein, all or a part of the outer surrounding surface of the image sensing chip is covered by the insulating connection structure, thereby adjusting a bonding force or a contact area between the insulating connection structure and the image sensing chip;

wherein a thickness of the insulating connection structure is less than or equal to a thickness of the image sensing chip and less than or equal to a thickness of the circuit substrate;

wherein the insulating connection structure has a lower surrounding surface that is exposed and not covered, and the lower surrounding surface of the insulating connection structure, the lower surface of the circuit substrate and the lower surface of the image sensing chip are flush with each other;

wherein the lower surrounding surface of the insulating connection structure has a resin separation mark generated after being separated from a temporary carrying substrate;

wherein the lower surrounding surface of the insulating connection structure has a resin deformation mark generated after being heated by a heat source provided by a heating module;

wherein the insulating connection structure has an extended connection portion extending to the upper surface of the circuit substrate, thereby increasing the bonding force or the contact area between the insulating connection structure and the circuit substrate;

wherein the image capturing module further includes a filter element disposed and supported above the image sensing chip by a plurality of support bodies or a surrounding support member, and the filter element is surrounded by the metal wires.

11. The image capturing module according to claim 1, wherein a thickness or viscosity of the bottom surrounding insulating layer is less than a thickness or viscosity of the top surrounding insulating layer.

12. The image capturing module according to claim 1, wherein a melting point of the bottom surrounding insulating layer is lower than a melting point of the top surrounding insulating layer.

13. The image capturing module according to claim 1, wherein a bonding force between the bottom surrounding insulating layer and the image sensing chip is smaller than a bonding force between the top surrounding insulating layer and the image sensing chip, and a bonding force between the bottom surrounding insulating layer and the circuit substrate is smaller than a bonding force between the top surrounding insulating layer and the circuit substrate.

14. The image capturing module according to claim 5, wherein a thickness or viscosity of the bottom surrounding insulating layer is less than a thickness or viscosity of the top surrounding insulating layer.

15. The image capturing module according to claim 5, wherein a melting point of the bottom surrounding insulating layer is lower than a melting point of the top surrounding insulating layer.

16. The image capturing module according to claim 5, wherein a bonding force between the bottom surrounding insulating layer and the image sensing chip is smaller than a bonding force between the top surrounding insulating layer and the image sensing chip, and a bonding force between the bottom surrounding insulating layer and the circuit substrate is smaller than a bonding force between the top surrounding insulating layer and the circuit substrate.

17. The portable electronic device according to claim 9, wherein a thickness or viscosity of the bottom surrounding insulating layer is less than a thickness or viscosity of the top surrounding insulating layer.

18. The portable electronic device according to claim 9, wherein a melting point of the bottom surrounding insulating layer is lower than a melting point of the top surrounding insulating layer.

19. The portable electronic device according to claim 9, wherein a bonding force between the bottom surrounding insulating layer and the image sensing chip is smaller than a bonding force between the top surrounding insulating layer and the image sensing chip, and a bonding force between the bottom surrounding insulating layer and the circuit substrate is smaller than a bonding force between the top surrounding insulating layer and the circuit substrate.

* * * * *